United States Patent
Yamada

(10) Patent No.: US 9,385,624 B2
(45) Date of Patent: Jul. 5, 2016

(54) RECTIFIER CIRCUIT

(71) Applicant: FUJI ELECTRIC CO., LTD., Kawasaki-shi (JP)

(72) Inventor: Ryuji Yamada, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/476,047

(22) Filed: Sep. 3, 2014

(65) Prior Publication Data

US 2014/0369100 A1 Dec. 18, 2014

Related U.S. Application Data

(63) Continuation of application No. PCT/JP2012/006765, filed on Oct. 23, 2012.

(30) Foreign Application Priority Data

Apr. 6, 2012 (JP) .................. 2012-087718

(51) Int. Cl.
*H02M 5/42* (2006.01)
*H02M 7/217* (2006.01)
(Continued)

(52) U.S. Cl.
CPC ............... *H02M 7/217* (2013.01); *H02M 7/06* (2013.01); *H02M 7/12* (2013.01)

(58) Field of Classification Search
CPC ... H02M 7/217; H02M 7/4826; H02M 7/487; H02M 1/4216; H02M 1/4208; H02M 7/219
USPC ......... 363/16–17, 37, 40, 49, 89, 97, 98, 127, 363/131, 132; 318/400.29, 801, 803, 807, 318/400.21, 400.23

See application file for complete search history.

(56) References Cited

U.S. PATENT DOCUMENTS 5,477,131 A * 12/1995 Gegner .................. H02M 3/158 323/222
5,654,882 A * 8/1997 Kanazawa ............ H02M 5/458 363/37

(Continued)

FOREIGN PATENT DOCUMENTS

CN 102232265 A 11/2011
JP 2003-009535 A 1/2003

(Continued)

OTHER PUBLICATIONS

Chinese Office Action dated Mar. 17, 2016, and its English translation.

*Primary Examiner* — Rajnikant Patel
(74) *Attorney, Agent, or Firm* — Rabin & Berdo, P.C.

(57) ABSTRACT

A rectifier circuit includes an inductor connected to AC inputs of a diode bridge circuit, a capacitor series circuit connected to a DC output, and bi-directional switches that are connected between the series connection point of the capacitors and the AC inputs of the diode bridge circuit. In order to reduce the loss that would occur if both bi-directional switches were driven at high frequency, one of the bi-directional switches is driven at the frequency of the AC input voltage and the other bi-directional switch is driven at a high frequency, and also general rectifying diodes are used as the diodes connected to the bi-directional switch that is driven at the frequency of the AC input voltage and fast recovery diodes are used as the diodes connected to the bi-directional switch that is driven at high frequency.

7 Claims, 2 Drawing Sheets

(51) Int. Cl.
*H02M 7/12* (2006.01)
*H02M 7/06* (2006.01)

(56) References Cited

U.S. PATENT DOCUMENTS

| | | | | |
|---|---|---|---|---|
| 5,751,567 A | * | 5/1998 | Toyozaki | H02M 1/4208 363/84 |
| 5,978,243 A | * | 11/1999 | Ishii | H02M 1/4208 363/84 |
| 6,320,772 B1 | * | 11/2001 | Doyama | H02M 1/4208 363/127 |
| 8,489,136 B2 | * | 7/2013 | Banks | H04L 1/0041 455/127.1 |
| 2011/0227522 A1 | | 9/2011 | Shinomoto et al. | |

FOREIGN PATENT DOCUMENTS

| JP | 2008-022625 | * | 1/2008 |
|---|---|---|---|
| JP | 2008-022625 A | | 1/2008 |
| JP | 2009-095083 A | | 4/2009 |
| JP | 2011-024285 A | | 2/2011 |
| JP | 2011-091947 A | | 5/2011 |
| WO | WO-2011/048818 A1 | | 4/2011 |

* cited by examiner

RECTIFIER CIRCUIT

CROSS-REFERENCE TO RELATED APPLICATIONS

This application is a continuation application of International Application number PCT/JP2012/006765, filed on Oct. 23, 2012 and designating the United States. Furthermore, this application claims the benefit of foreign priority of Japanese application 2012-087718, filed on Apr. 6, 2012. The disclosures of these earlier applications are hereby incorporated herein by reference.

TECHNICAL FIELD

The present invention relates to loss reduction technology in a rectifier using a semiconductor switching element.

BACKGROUND ART

FIG. 3 shows a circuit according to a conventional system which is disclosed in Patent Document 1 (which is identified below). In FIG. 3, reference numeral 1 denotes an AC power supply, reference numeral 2 denotes a inductor, reference numerals 3 to 6 denote diodes, and reference numerals 7 to 10 denote semiconductor switches, which are taken here to be MOSFETs (Metal-oxide-semiconductor field effect transistors). The MOSFETs are always in a conducting state in the reverse direction, due to the presence of a parasitic diode (illustrated). By connecting the MOSFETs in a reverse series arrangement, a so-called bi-directional semiconductor switch is composed which is capable of controlling the passing and shutting off of current in both the forward and reverse directions. Reference numerals 11 and 12 denote capacitors, and reference numeral 13 denotes a load. Here, there may also be cases where a load is connected in parallel with the capacitor 11 or 12.

This circuit is a so-called rectifier circuit which converts alternating current to direct current, and has a function for keeping the DC output (P-N) voltage Vout to a desired value higher than the peak value of the AC input voltage Vin, while keeping the input current Iin to a sinusoidal waveform of equal phase to the AC input voltage Vin.

The operation for achieving these functions will be described below. For example, if the AC input voltage Vin is positive and the voltage relationship is Vin<Vout/2, then when the gates of the bi-directional semiconductor switch MOSFETs 7 to 10 are all on, the potential of the contact point U1 of the diodes 3 and 5 is equal to the potential of the point M of the DC output and the point V of the AC power supply 1, and the voltage between U1 and V becomes 0 V. Therefore, a current flows along a path from the AC power supply 1, to the inductor 2, to the MOSFET 7, to the MOSFET 8, to the MOSFET 10, to the MOSFET 9, to the AC power supply 1, and the voltage Vin of the AC power supply 1 is applied to both ends of the inductor 2 and the input current Iin increases. This state is called a 0 voltage mode below.

Next, when the MOSFET 7 is switched off, a current flows along a path from the AC power supply 1, to the inductor 2, to the diode 3, to the capacitor 11, to the MOSFET 10, to the MOSFET 9, to the AC power supply 1, thereby charging the capacitor 11. In this case, the differential voltage between the AC input voltage Vin and the voltage Vout/2 of the capacitor 11 is applied to the inductor 2, and the input current Iin is reduced. The voltage between U1 and V in this case is the voltage Vout/2 of the capacitor 11. Below, this state is called a 1/2 voltage mode 1a.

Furthermore, when the MOSFET 10, rather than the MOSFET 7, is switched off, a current flows along a path from the AC power supply 1, to the inductor 2, to the MOSFET 7, to the MOSFET 8, to the capacitor 12, to the diode 6, to the AC power supply 1, thereby charging the capacitor 12. In this case, the differential voltage between the AC input voltage Vin and the voltage Vout/2 of the capacitor 12 is applied to the inductor 2, and the input current Iin is reduced. The voltage between U1 and V in this case is the voltage Vout/2 of the capacitor C12. Below, this state is called a 1/2 voltage mode 1a.

If the AC input voltage Vin is positive and the voltage relationship is Vin>Vout/2, then when the gates of MOSFETs 7 and 8 are off and the gates of the MOSFETs 9 and 10 are on, current flows along a path from the AC power supply 1, to the inductor 2, to the diode 3, to the capacitor 11, to the MOSFET 10, to the MOSFET 9, to the AC power supply 1, thereby charging the capacitor 11. In this case, the voltage differential between the AC input voltage Vin and the voltage Vout/2 of the capacitor 12 is applied to the inductor 2, and in this case, since the AC input voltage Vin is greater than the voltage Vout/2 of the capacitor 11, then the input current Iin increases. The voltage between U1 and V in this case is the voltage Vout/2 of the capacitor 11. Below, this state is called a 1/2 voltage mode 1b.

Similarly, when the gates of the MOSFETs 7 and 8 are switched on, and the gates of the MOSFETs 9 and 10 are off, a current flows along a path from the AC power supply 1, to the inductor 2, to the MOSFET 7, to the MOSFET 8, to the capacitor 12, to the diode 6, to the AC power supply 1, thereby charging the capacitor 12, and the input current Iin increases. The voltage between U1 and V in this case is the voltage Vout/2 of the capacitor 12. Below, this state is called a 1/2 voltage mode 2b.

In other words, in the name of the 1/2 voltage mode indicated above, the suffix 1 represents a mode of charging the capacitor 11, the suffix 2 represents a mode of charging the capacitor 12, the suffix a represents a mode wherein the input current Iin decreases, and the suffix b represents a mode wherein the input current Iin increases.

From these respective modes, if the gates of the MOSFETs 7 to 10 are all switched off, then a current flows along a path from the AC power supply 1, to the inductor 2, to the diode 3, to the capacitor 11, to the capacitor 12, to the diode 6, to the AC power supply 1, and the differential voltage between the AC input voltage Vin and the DC output voltage Vout is supplied to the inductor 2. In a normal operational state of the device, the AC input voltage Vin is lower than the DC output voltage Vout, and the input current Iin decreases. The voltage between U1 and V in this case is the DC output voltage Vout. This state is called a full voltage mode below.

By switching the MOSFETs 7 and 8, or the MOSFETs 9 and 10, at high frequency, and controlling the time ratio of this on/off switching, the shape and size of the input current Iin can be controlled arbitrarily if the mode described above is switched. Consequently, the waveform of the input current Iin is taken to have a sinusoidal shape (here, ripples are ignored), and furthermore, it is possible to keep the DC output voltage Vout at a desired value by controlling the amplitude of the input current Iin in accordance with the load power. The same operation is possible when the AC input voltage Vin is negative. As indicated above, this circuit is a so-called three-level circuit, which is capable of holding the voltage between U1 and V at three voltages: 0 V; Vout/2; and Vout.

In the operation described above, if the input current Iin is positive and the MOSFETs 7 and 8 are switched on, for example, then provided that the gate of the MOSFET 7 is on, the MOSFET 8 will be in a conductive state due to the parasitic diode, regardless of whether the gate of the MOSFET 8 is on or off, but a current also flows in the MOSFET 8 itself due to the on signal being applied to the gate of the MOSFET 8. The diode has a forward voltage drop of no less than a fixed value, regardless of the current, but since the forward voltage drop of the MOSFET has the characteristic of being directly proportional to the current, then it is possible to reduce the forward voltage drop especially when the current is small, which is effective in reducing conduction loss. This is well known generally as synchronous rectification technology. Consequently, control is implemented to apply an on signal to the gates of all of the MOSFETs which are to pass current, regardless of the polarity of the current, as described above.

Patent Document 1: Japanese Patent Application Publication No. 2008-22625

DISCLOSURE OF THE INVENTION

In recent years, there have been demands for low loss, in other words, high efficiency, in power supply devices, due to environmental problems, and the like. In the circuit illustrated in FIG. 3, the MOSFETs each have an application voltage of Vout/2, and are not required to have withstand voltage to the DC output voltage Vout, and therefore it is possible to use MOSFETs which have low withstand voltage and a low forward voltage drop. Moreover, since the forward voltage drop in the MOSFETs is directly proportional to the current, as described above, then it is possible to reduce the forward voltage drop accordingly, by using MOSFETs having a large current capacity or increasing the number of MOSFETs connected in parallel.

On the other hand, the following problems are involved in reducing the forward voltage drop of the diode.

When the MOSFETs 7 and 8 perform high-frequency switching, then a high-frequency voltage is applied to the diodes 3 and 4, thereby passing and shutting off a current at high frequency. Similarly, when the MOSFETs 9 and 10 perform high-frequency switching, then a high-frequency voltage is applied to the diodes 5 and 6, thereby passing and shutting off a current at high frequency. In FIG. 2 and FIG. 3, etc. of Patent Document 1, both bi-directional semiconducting switches are made to perform high-frequency switching. In order to withstand this high-frequency operation, so-called fast recovery diodes which have a short reverse recovery time (the current shut-off time when a reverse voltage is applied) are used for the diodes 3 to 6. On the other hand, fast recovery diodes are used to rectify commercial frequencies, and there is a tendency for the forward voltage drop therein to be higher than in general rectifying diodes.

In the full voltage mode where the MOSFETs 7 to 10 are all off in the operation described above, the input current Iin is passed through two diodes. Moreover, to make the input current Iin have a sinusoidal shape, time ratio control is implemented in such a manner that the voltage between the ends of the inductor 2, in other words, the voltage differential between the AC input voltage Vin and the low-frequency component of the voltage between U1 and V, becomes a prescribed value. Consequently, if the instantaneous value of the AC input voltage Vin is high, then the low-frequency component of the voltage between U1 and V becomes higher, and in accordance with this, the time ratio of the full voltage mode becomes greater. Since power factor 1 control is implemented in the vicinity of the peak of the AC input voltage Vin, then in the vicinity of the peak of the input current Iin, a voltage drop corresponding to two diodes occurs when the current is high, and therefore the conduction loss becomes yet greater, thus leading to reduction in the overall efficiency of the device. Furthermore, fast recovery diodes are more expensive than rectifying diodes. In particular, a Schottky barrier diode made of SiC (silicon carbide) has characteristics whereby virtually no reverse recovery loss occurs, which is suitable for high-frequency usage, but such diodes are expensive at the current time.

Therefore, the problem of the present invention is to provide an inexpensive rectifier circuit having little generation loss which is capable of making the AC input current sinusoidal in shape, as a rectifier circuit which generates DC voltages of three levels, from an AC voltage.

In order to resolve the abovementioned problem, a first invention is a so-called rectifier circuit which converts an AC input voltage to DC voltage, in which one end of a inductor is connected to one end of an AC power supply, one AC input of a diode bridge circuit composed by parallel connection of diode series circuits is connected to the other end of the inductor, and the other AC input of the diode bridge circuit is connected to the other end of the AC power supply, a capacitor series circuit in which a plurality of capacitors are connected in series is connected between DC output terminals of the diode bridge circuit, with the rectifier circuit being composed by respectively connecting an intermediate connection point of the capacitor series circuit and the one and the other AC inputs of the diode bridge circuit, via bi-directional semiconductor switches capable of controlling the passing and shutting off of current in two directions, which are a forward direction and a reverse direction, and the bi-directional semiconductor switches being composed by one or a plurality of semiconductors, wherein the diodes constituting one of the diode series circuits are so-called fast recovery diodes which have a shorter reverse recover time than general rectifying diodes, and the diodes constituting the other diode series circuit are so-called general rectifying diodes which have a longer reverse recovery time and smaller forward voltage drop than the fast recovery diodes.

In a second invention, one of the bi-directional semiconductor switches according to the first invention is driven at the frequency of the AC input voltage and the other is driven at a frequency higher than the frequency of the AC input voltage.

In a third invention, the bi-directional semiconductor switch connected to the series connection point of the diode series circuit constituted by the general rectifying diodes in the first or second invention is driven at the frequency of the AC input voltage, and the bi-directional semiconductor switch connected to the series connection point of the diode series circuit constituted by the fast recovery diodes is driven at a frequency higher than the frequency of the AC input voltage.

In a fourth invention, MOSFETs (Metal-oxide-semiconductor field effect transistors) are used instead of the general rectifying diodes in the first to third inventions.

In a fifth invention, Schotty barrier diodes made of SiC (silicon carbide) are used instead of the fast recovery diodes in the first to fourth inventions.

The present invention is a rectifier circuit in which one end of a reactor is connected to one end of an AC power supply, one AC input of a diode bridge circuit is connected to the other end of the inductor, the other AC input of the diode bridge circuit is connected to the other end of the AC power supply, capacitor series circuits are connected respectively between the DC output terminals of the diode bridge circuit, and an intermediate contact point of the capacitor series circuits and the one and the other AC inputs of the diode bridge circuit are respectively connected via bi-directional semiconductor switches, wherein the diodes constituting one of the diode series circuits are fast recovery diodes and the diodes constituting the other diode series circuit are general rectifying diodes. In this case, one of the bi-directional semiconductor switches is switched on and off at the frequency of the AC power supply and the other thereof is switched on and off at a frequency higher than the frequency of the AC power supply.

As a result of this, it is possible to use general rectifying diodes, instead of conventional fast recovery diodes, and loss reduction and low cost can be achieved.

BEST MODE FOR CARRYING OUT THE INVENTION

The principal feature of the present invention is a rectifier circuit, wherein one end of a inductor is connected to one end of an AC power supply, one AC input of a diode bridge circuit is connected to the other end of the reactor, another AC input of the diode bridge circuit is connected to the other end of the AC power supply, capacitor series circuits are connected respectively between the DC output terminals of the diode bridge circuit, and an intermediate contact point of the capacitor series circuits and the one and the other AC inputs of the diode bridge circuit are respectively connected via bi-directional semiconductor switches, wherein the diodes constituting one of the diode series circuits are fast recovery diodes and the diodes constituting the other diode series circuit are general rectifying diodes, one bi-directional semiconductor switch being switched on and off at the frequency of the AC power supply and the other bi-directional semiconductor switch being switched on and off at a frequency higher than the frequency of the AC power supply.

First Embodiment

Figure 1:
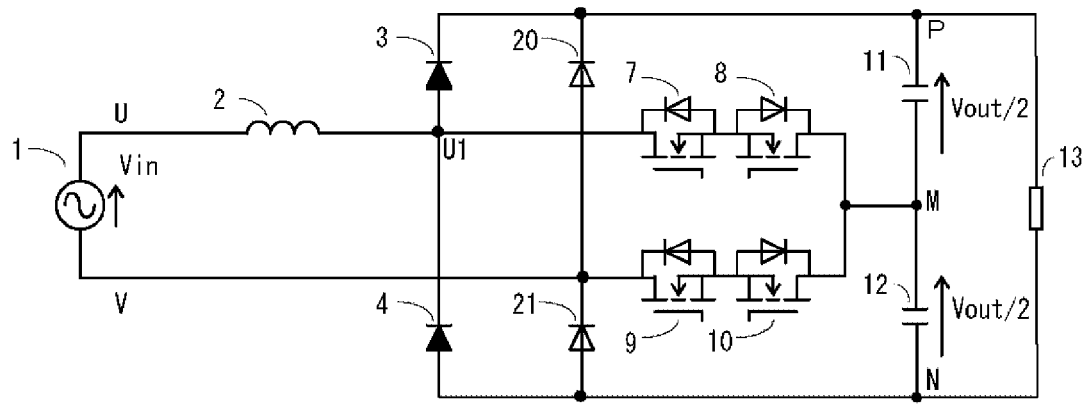
FIG. 1 is a circuit diagram showing a first embodiment of the present invention.
Figure 3:
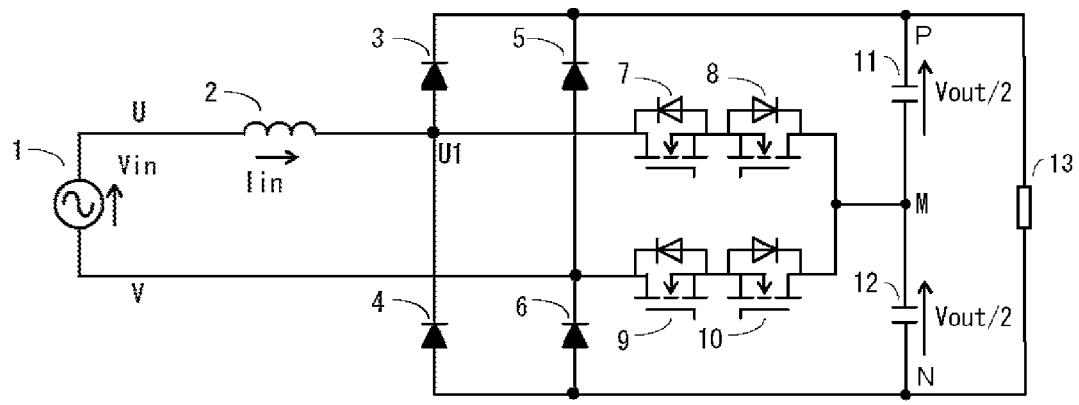
FIG. 3 is a circuit diagram showing a prior art example.

FIG. 1 shows a first embodiment of the present invention. The circuit configuration is similar to the prior art shown in FIG. 3, but the fast recovery diodes 5 and 6 in the prior art are substituted with general rectifying diodes 20 and 21. This operation is indicated below. Under conditions where the AC input voltage Vin is positive and the voltage relationship is Vin<Vout/2, the gates of the MOSFETs 9 and 10 constituting the bi-directional semiconductor switches are kept in an on signal state at all times, and high-frequency switching is performed by the MOSFETs 7 and 8 which constitute the bi-directional semiconductor switches. In other words, the 0 voltage mode and the 1/2 voltage mode 1a described in the prior art example are used. The diodes 20 and 21 do not pass current in either mode. Here, the 1/2 voltage mode 2a is not used.

Under conditions where the AC input voltage Vin is positive and the voltage relationship is Vin>Vout/2, the gates of the MOSFETs 9 and 10 are kept in an off signal state at all times, and high-frequency switching is performed by the MOSFETs 7 and 8. In other words, the 1/2 voltage mode 2b and the full voltage mode described in the prior art example are used. Since the diode 21 and the diode 20 are kept respectively in a conducting and a non-conducting state in both modes, then provided that the device is operated between these two modes, the conducting state of the diodes 20 and 21 does not change and a high frequency is not applied to the diodes 20 and 21. Here, the 1/2 voltage mode 1b is not used.

According to the operation described above, the diode 21 performs a reverse recovery operation when the AC input voltage Vin becomes lower than Vout/2 and the MOSFETs 9 and 10 switch on, and this occurs only once in each cycle of the AC input voltage and hence there is no problem in using a diode having a long reverse recovery time.

The same also applies when the AC input voltage Vin is negative; the MOSFETs 9 and 10 switch on and off once each in half a cycle, according to the magnitude of the absolute value of the AC input voltage Vin with respect to Vout/2. In this case, the diode 20 passes current while the MOSFET 9 is switched off.

Second Embodiment

Figure 2:
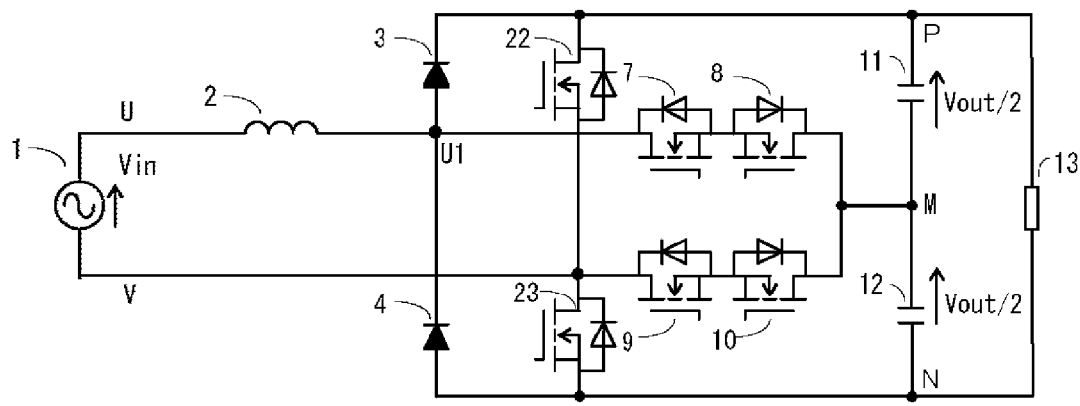
FIG. 2 is a circuit diagram showing a second embodiment of the present invention.

FIG. 2 shows a second embodiment of the present invention. The diodes 20 and 21 in the first embodiment are substituted with MOSFETs 22 and 23. As described above, the MOSFETs also pass current in the reverse direction by applying a voltage to the gate, and the forward voltage drop can be made small in particular when the current is small. This can be achieved by applying an on signal to one of the gates of the MOSFETs 22 and 23 in accordance with the polarity of the input current Iin, when applying an off signal to the gates of the MOSFETs 9 and 10. In recent years, the energy efficiency of power conversion devices throughout the whole period of operation has come under focus, rather than just the power conversion efficiency at the rated point. For example, with power supply devices for information equipment, or the like, it is considerably rare for the device to bear a load close to the rated power. This is because the devices are designed with spare capacity in order to prevent power supply failures due to overloads, and consequently, the efficiency at around 50% load or light load is important. The circuit in FIG. 2 is useful means for improving efficiency under light load in situations of this kind. The MOSFETs 22 and 23 may be connected in parallel, with the diodes 20 and 21 being left as they are.

It might appear at first sight that the diodes 3 and 4 could be substituted with MOSFETs, but in actual practice, a MOSFET having low conduction loss which is capable of withstanding several hundred volts or more will have a long reverse recovery time of the parasitic diode, and for this and other reasons, such a MOSFET is not suitable for a high-frequency rectifying operation and therefore application thereof is difficult. A feature of the present invention is that by operating one side of a rectifying circuit at low frequency, then rectification by a MOSFET capable of withstanding several hundred volts becomes possible.

Third Embodiment

The third embodiment uses SiC (silicon carbide) Schottky barrier diodes, instead of the fast recovery diodes according to the first and second embodiments. Since the SiC (silicon carbide) Schottky recovery diodes do not perform a reverse recovery operation, then the switching loss can be reduced yet further compared to the first and second embodiments, and the conversion efficiency of the device can be improved.

In the embodiments described above, a configuration is described in which MOSFETs are connected in reverse parallel arrangement as the bi-directional semiconductor switches, but the type of semiconductor is not limited to a MOSFET, and it is also possible to adopt a configuration in which reverse-blocking switching elements are connected in reverse parallel arrangement, or a configuration in which diodes and switching elements are combined, or the like.

INDUSTRIAL APPLICABILITY

The present invention is a proposal for loss reduction technology in an AC to DC conversion circuit, and can be applied to a DC power supply, an uninterruptible power supply system, a power conversion apparatus for driving an electric motor, or the like.

EXPLANATION OF REFERENCE NUMERALS

1: AC power supply; 2: inductor; 3 to 6: fast recovery diode; 7 to 10, 22, 23: MOSFET; 11, 12: capacitor; 13: load; 20, 21: general rectifying diode

The invention claimed is:

1. A rectifier circuit which converts an AC input voltage that is received at first and second AC input terminals to DC voltage, comprising:
   a diode bridge that includes a first series of diodes and a second series of diodes connected in parallel to the first series of diodes, the diode bridge including a first AC input node, a second AC input node, a first rectifier output node, and a second rectifier output node, the second AC input node being connected to the second AC input terminal;
   an inductor connected between the first AC input terminal and the first AC input node of the diode bridge;
   a capacitor series circuit in which a plurality of capacitors are connected in series between the first and second output nodes of the diode bridge, the capacitor series circuit having an intermediate connection node between two of the capacitors;
   a first bi-directional switch capable of passing and shutting off current in a forward direction and in a reverse direction, the first bi-directional switch being connected between the first AC input node of the diode bridge and the intermediate connection node; and
   a second bi-directional switch capable of passing and shutting off current in a forward direction and in a reverse direction, the second bi-directional switch being connected between the second AC input terminal and the intermediate connection node,
   wherein the diodes in the first series of diodes are fast recovery diodes and the diodes in the second series of diodes are not fast recovery diodes, the diodes in the first series of diodes having shorter reverse recover time than the diodes in the second series of diodes, the diodes in the second series of diodes having smaller forward voltage drop than the fast recovery diodes, and
   wherein the first bi-directional switch is driven at a first frequency that is higher than a second frequency at which the second bi-directional switch is driven.

2. The rectifier circuit according to claim 1, wherein the second frequency is substantially the same as the frequency of the AC input voltage.

3. A rectifier circuit which converts an AC input voltage that is received at first and second AC input terminals to DC voltage, comprising:
   a rectifying bridge that includes a first series of semiconductor elements and a second series of semiconductor elements connected in parallel to the first series of semiconductor elements, the rectifying bridge including a first AC input node, a second AC input node, a first rectifier output node, and a second rectifier output node, the second AC input node being connected to the second AC input terminal;
   an inductor connected between the first AC input terminal and the first AC input node of the rectifying bridge;
   a capacitor series circuit in which a plurality of capacitors are connected in series between the first and second output nodes of the rectifying bridge, the capacitor series circuit having an intermediate connection node between two of the capacitors;
   a first bi-directional switch capable of passing and shutting off current in a forward direction and in a reverse direction, the first bi-directional switch being connected between the first AC input node of the rectifying bridge and the intermediate connection node; and
   a second bi-directional switch capable of passing and shutting off current in a forward direction and in a reverse direction, the second bi-directional switch being connected between the second AC input terminal and the intermediate connection node,
   wherein the semiconductor elements in the first series of semiconductor elements are first semiconductor elements and the semiconductor elements in the second series of semiconductor elements are second semiconductor elements, the first semiconductor elements having a shorter reverse recover time than the second semiconductor elements, the second semiconductor elements having a smaller forward voltage drop than the first semiconductor elements, and
   wherein the first bi-directional switch is driven at a first frequency that is higher than a second frequency at which the second bi-directional switch is driven.

4. The rectifier circuit according to claim 3, wherein the second frequency is substantially the same as the frequency of the AC input voltage.

5. The rectifier circuit according to claim 4, wherein the first and second semiconductor elements are all diodes, but the first semiconductor elements are fast recovery diodes and the second semiconductor elements are not fast recovery diodes.

6. The rectifier circuit according to claim 4, wherein the first semiconductor elements are fast recovery diodes and the second semiconductor elements are MOSFETs.

7. The rectifier circuit according to claim 4, wherein the first semiconductor elements are Schottky barrier diodes made of silicon carbide and the second semiconductor elements are diodes but not Schottky barrier diodes.

* * * * *